(12) United States Patent
Wan et al.

(10) Patent No.: US 7,610,591 B2
(45) Date of Patent: Oct. 27, 2009

(54) SUPPORTING MECHANISM FOR OPTICAL PICKUP HEAD

(75) Inventors: Li-Ming Wan, Shenzhen (CN); Chien-ting Lo, Tu-Cheng (TW); Bin-Hai Guo, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 695 days.

(21) Appl. No.: 11/254,585

(22) Filed: Oct. 20, 2005

(65) Prior Publication Data

US 2006/0087933 A1 Apr. 27, 2006

(30) Foreign Application Priority Data

Oct. 27, 2004 (CN) ............... 2004 2 00945756 U

(51) Int. Cl.
*G11B 7/08* (2006.01)
*G11B 21/02* (2006.01)

(52) U.S. Cl. .................... 720/677; 720/675

(58) Field of Classification Search .......... 720/675, 720/677, 679, 676
See application file for complete search history.

(56) References Cited

U.S. PATENT DOCUMENTS

| 5,615,204 | A | 3/1997 | Watanabe et al. | |
| 6,285,649 | B1 * | 9/2001 | Bessho et al. | 720/675 |
| 6,795,971 | B2 | 9/2004 | Lin | |
| 6,813,773 | B2 * | 11/2004 | Liao et al. | 720/675 |
| 7,055,161 | B2 * | 5/2006 | Choi | 720/675 |
| 7,216,354 | B2 * | 5/2007 | Hermanns | 720/679 |
| 7,219,357 | B2 * | 5/2007 | Furuya et al. | 720/675 |
| 7,257,829 | B2 * | 8/2007 | Bao | 720/678 |
| 7,370,340 | B2 * | 5/2008 | Burkart et al. | 720/675 |
| 2002/0186646 | A1 * | 12/2002 | Akiba | 369/249 |
| 2004/0205794 | A1 * | 10/2004 | Chang | 720/675 |
| 2004/0246830 | A1 | 12/2004 | Bao | |
| 2005/0097585 | A1 * | 5/2005 | Pan | 720/675 |
| 2005/0198660 | A1 * | 9/2005 | Kim et al. | 720/679 |
| 2005/0216928 | A1 * | 9/2005 | Hara et al. | 720/677 |

* cited by examiner

*Primary Examiner*—Brian E Miller
(74) *Attorney, Agent, or Firm*—Frank R. Niranjan

(57) ABSTRACT

An optical disc apparatus includes a chassis, a pickup device, a guide shaft, a fixing base member, a holding member and an elastically deformable member. The pickup device is configured to perform writing and/or reading of information with respect to an optical disc. The guide shaft is configured to movably support said pickup device. The fixing base member is attached to the chassis and configured to fasten one end of the guide shaft. The holding member is attached to the chassis, and includes a receiving chamber in which a corresponding end of the guide shaft. The elastically deformable member for resiliently pressing a corresponding end of said guide shaft in said receiving chamber includes a pressing portion above the receiving chamber of the holding member and a fixing portion engageable with the holding member for attaching the deformable member to the holding member.

13 Claims, 5 Drawing Sheets

SUPPORTING MECHANISM FOR OPTICAL PICKUP HEAD

BACKGROUND

1. Field of the Invention

The present invention generally relates to supporting mechanisms involving optical pickup devices, and more particularly to a mechanism for supporting a guide shaft on a chassis for use in an optical disc apparatus.

2. Related Art

An optical disc such as a digital versatile disc (DVD) is a recording medium containing information along concentric or spiral tracks. In an optical disc apparatus, the optical disc is loaded on a turntable by a disc loading device, and is then rotated by a spindle motor. As the disc rotates, an optical pickup device travels in a radial direction of the optical disc and projects a laser beam onto tracks of the optical disc. The laser beam emitted by the optical pickup device is incident on the optical disc, for recording or reading information to or from the optical disc. Accordingly, a feeding mechanism is usually provided in the optical disc apparatus, for guiding and driving the optical pickup device to move in the radial direction of the optical disc.

FIG. 5 is a top plan view of parts of an optical disc apparatus 9, including a conventional feeding mechanism 90 for feeding an optical pickup device 92. The optical disc apparatus 9 also has a chassis 91, and the feeding mechanism 90 is attached to the chassis 91. The feeding mechanism 90 includes a pair of parallel guide shafts 93, a fixing seat 95, three adjustable seats 96, and a driving means 94. The fixing seat 95 and the adjustable seats 96 are fastened on the chassis 91 in two parallel alignments, each receiving an end of the pair of guide shafts 93 therein. In this way, the pair of guide shafts 93 is supported above the chassis 91, with two lateral sides of the optical pickup device 92 being respectively slidably engaged on the guide shafts 93. Thus, the path of movement of the optical pickup device 92 is precisely controlled. The driving means 94 is installed on the chassis 91 substantially parallel to the pair of guiding shafts 93, and generates a driving force applied to the optical pickup device 92.

The rapid advancement of multimedia applications has spawned systems that store information more compactly. In particular, the distance between adjacent recording pits of a modern optical disc is less than previously. This in turn requires that the laser beam generated by the optical pickup device 92 perpendicularly radiates to the optical disc when recording or reproducing information. Thus the guide shafts 93 should be precisely parallel to the optical disc, at exactly the same height to the optical disc.

Therefore, each adjustable seat 96 of the above-described feeding mechanism 90 usually includes a receiving chamber (not shown) at which a spring (not shown) is installed. The corresponding end of the corresponding guide shaft 93 is supported on the spring. An adjusting screw 97 is engaged in a top of the adjustable seat 96, and an end of the adjusting screw 97 extends into the receiving chamber and pushes the end of the guide shaft 93 supported on the spring. As a result, the ends of the guide shafts 93 are positioned in the receiving chambers of the adjustable seats 96 after being adjusted to respective desired locations.

However, it is inconvenient to install the springs in the adjustable seats 96. This is because the springs set in the receiving chambers of the adjustable seats 96 are very small. Therefore, referring to FIG. 6, an improved adjusting base 96' has been devised. The adjusting base 96' is integrally formed as a single piece, and includes an elastic support 960' at a top thereof. The elastic support 960' has a hook end 961'. A receiving chamber 962' is defined under the elastic support 960', and a recess 964' defined in a front wall of the adjusting base 96' communicates with the receiving chamber 962'. Therefore the end of one of the guide shafts 93 (shown in FIG. 5) can be inserted through the recess 964' into the receiving chamber 962', so that the hook end 961' of the elastic support 960' downwardly presses the end of the guide shaft 93. In order to adjust the height of the end of the guide shaft 93, an adjusting screw (not shown) is inserted into the receiving chamber 962' from a bottom of the adjusting base 96'. However, it is inconvenient to assemble the associated optical disc apparatus. This is because the ends of the guide shafts 93 have to be inserted into the receiving chambers 962' of the adjusting bases 96' from the fronts of the adjusting bases 96'.

Therefore, a heretofore unaddressed need exists in the industry to address the aforementioned deficiencies and inadequacies related to inconvenient assembly.

SUMMARY

One embodiment provides an optical disc apparatus. The optical disc apparatus includes a chassis, a pickup device, a guide shaft, a fixing base member, a holding member and an elastically deformable member. The pickup device is configured to perform writing and/or reading of information with respect to an optical disc. The guide shaft is configured to movably support said pickup device. The fixing base member is attached to the chassis and configured to fasten one end of the guide shaft. The holding member is attached to the chassis, and includes a receiving chamber in which a corresponding end of the guide shaft. The elastically deformable member for resiliently pressing a corresponding end of said guide shaft in said receiving chamber includes a pressing portion above the receiving chamber of the holding member and a fixing portion engageable with the holding member for attaching the deformable member to the holding member.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF PREFERRED EMBODIMENTS

Hereinafter, an embodiment of an optical disc apparatus according to the present invention will be described in detail with reference to the accompanying drawings.

Figure 1:
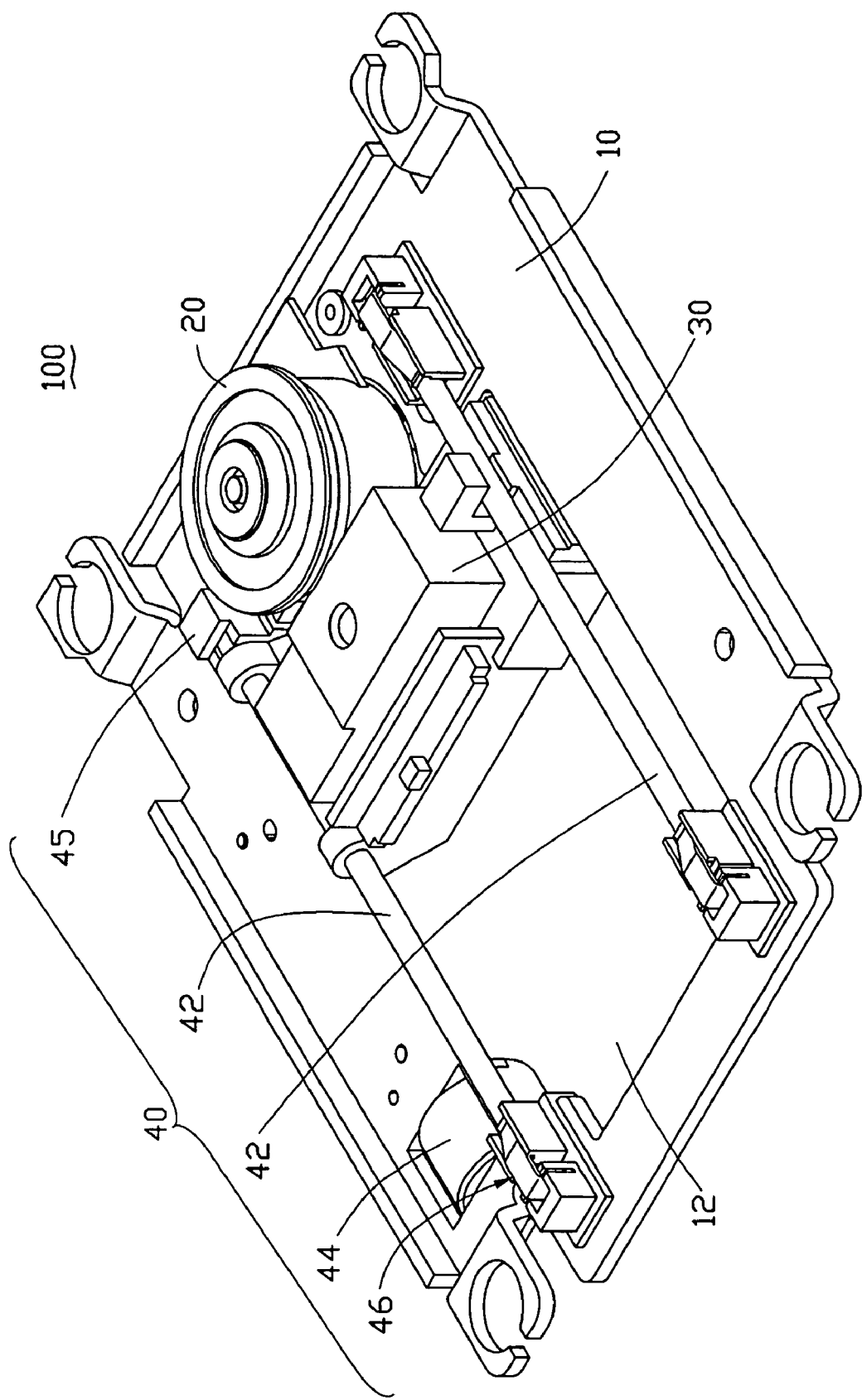
FIG. 1 is an isometric view of an optical disc apparatus according to a preferred embodiment of the present invention, with a front end thereof in the right background.
Figure 2:
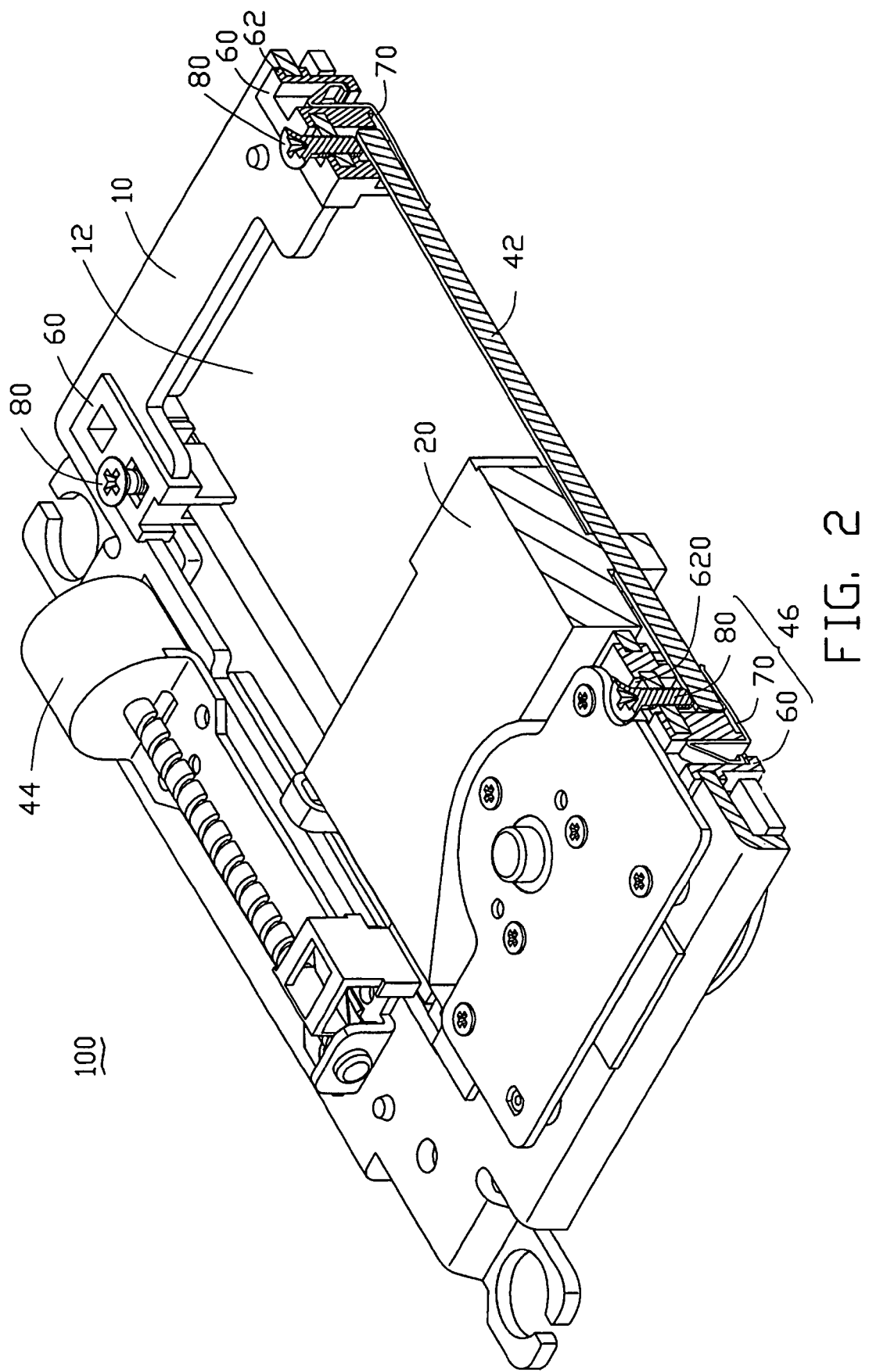
FIG. 2 is an inverted, cut-away view of the optical disc apparatus of FIG. 1, with the front end thereof in the left foreground.

Referring to FIG. 1 and FIG. 2, an optical disc apparatus 100 (not fully shown) includes a chassis 10 with a longitudinal opening 12 therein, a spindle motor 20, an optical pickup device 30, and a feeding mechanism 40. The optical disc apparatus 100 may be a disc reading apparatus, a disc recording apparatus, or a combined disc reading/recording apparatus. The spindle motor 20 is installed on the chassis 10 near a short side of the longitudinal opening 12. The spindle motor 20 is for rotating an optical disc (not shown) loaded thereon. The optical pickup device 30 is supported by the feeding mechanism 40 in the longitudinal opening 12 and is movable along a radial direction of the optical disc loaded on the spindle motor 20.

The feeding mechanism 40 supports and controls movement of the optical pickup device 30, includes a pair of guide shafts 42, a feeding motor 44, a fixing base member 45, and three adjusting mechanisms 46. The fixing base member 45 and three adjusting mechanisms 46 are respectively located at four corners of the opening 12 of the chassis 10, to receive four ends of the pair of guide shafts 42 therein respectively. Thus, the guide shafts 42 are positioned above the opening 12 and are substantially parallel to a top face of the chassis 10. Two opposite lateral sides of the optical pickup device 30 are slidably engaged on the pair of guide shafts 42. The feeding motor 44 is also installed in the chassis 10, for generating a driving force applied to the optical pickup device 30.

Figure 3:
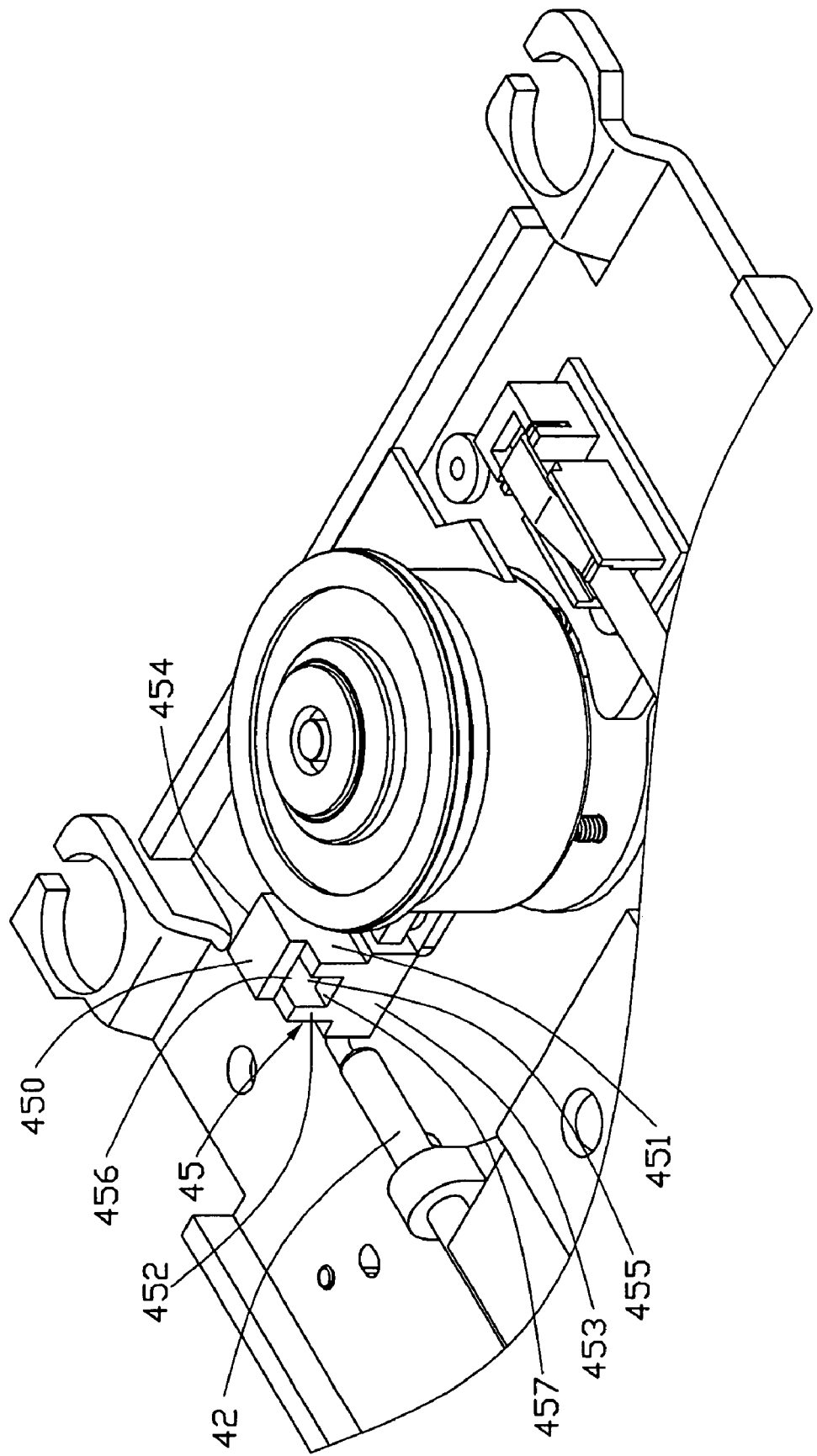
FIG. 3 is a slightly enlarged view of the front end of the optical disc apparatus of FIG. 1, partially cut away to show details of a fixing base member thereof.

Referring to FIG. 3, each fixing base member 45 is integrally formed with the chassis 10. The fixing base member 45 has two opposite sidewalls 451 and 452, and a top wall 450, an inner wall 453 and an outer wall 454 perpendicularly interconnecting with the sidewalls 451, 452 at a top, front and rear sides of the fixing base member 45, respectively, so as to enclose a first receiving chamber 455 for receiving one end of the corresponding guide shaft 42. A cutout 456 communicating with the receiving chamber 455 is defined at a front side of the top wall 450, for convenient insertion of the end of the guide shaft 42 into the first receiving chamber 455. A recess 457 also communicating with the first receiving chamber 455 is defined at a top side of the inner wall 453.

Figure 4:
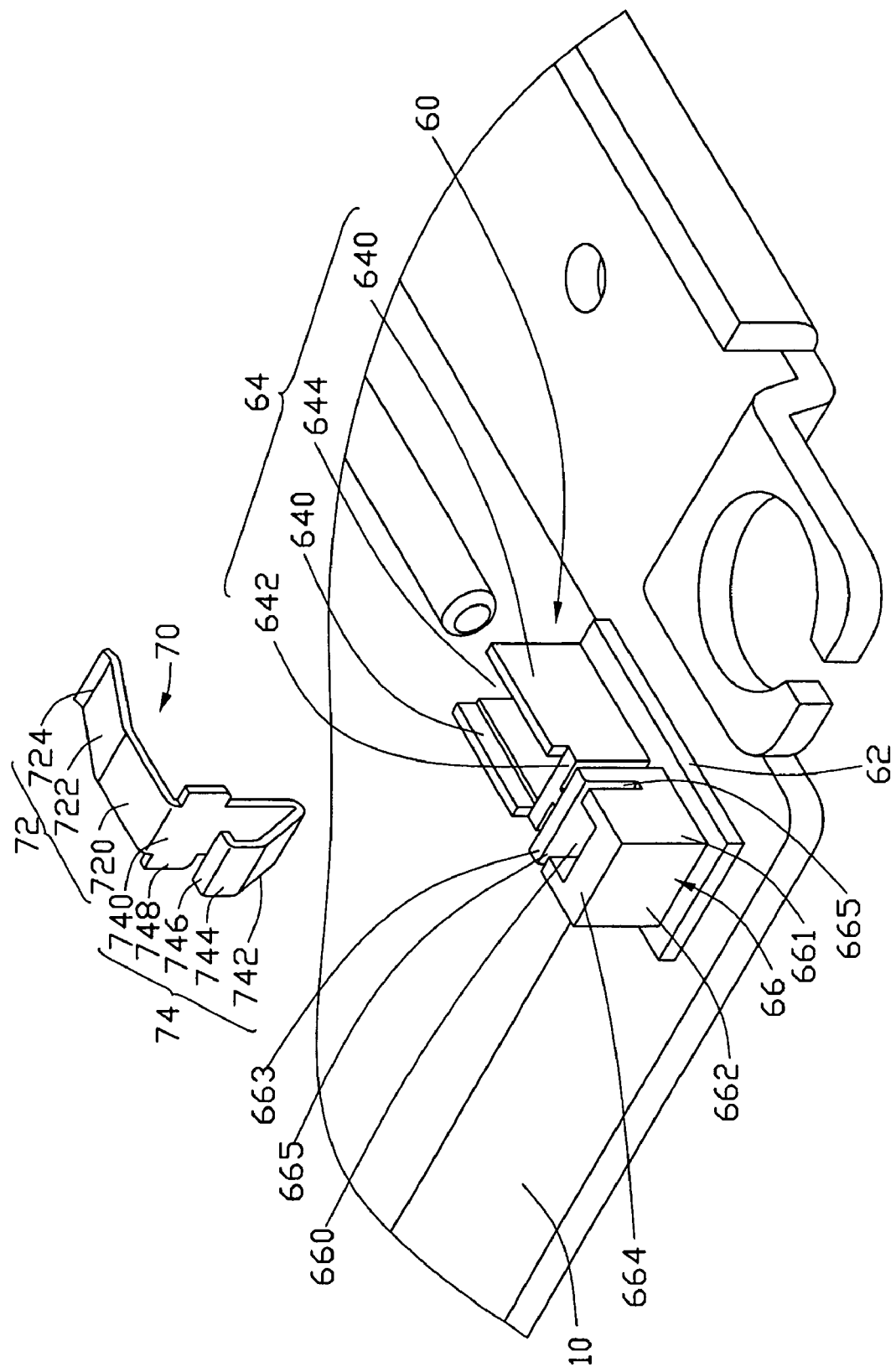
FIG. 4 is an enlarged, exploded view of a rear end corner of the optical disc apparatus of FIG. 1, partially cut away to show details of a holding member thereof.
Figure 5:
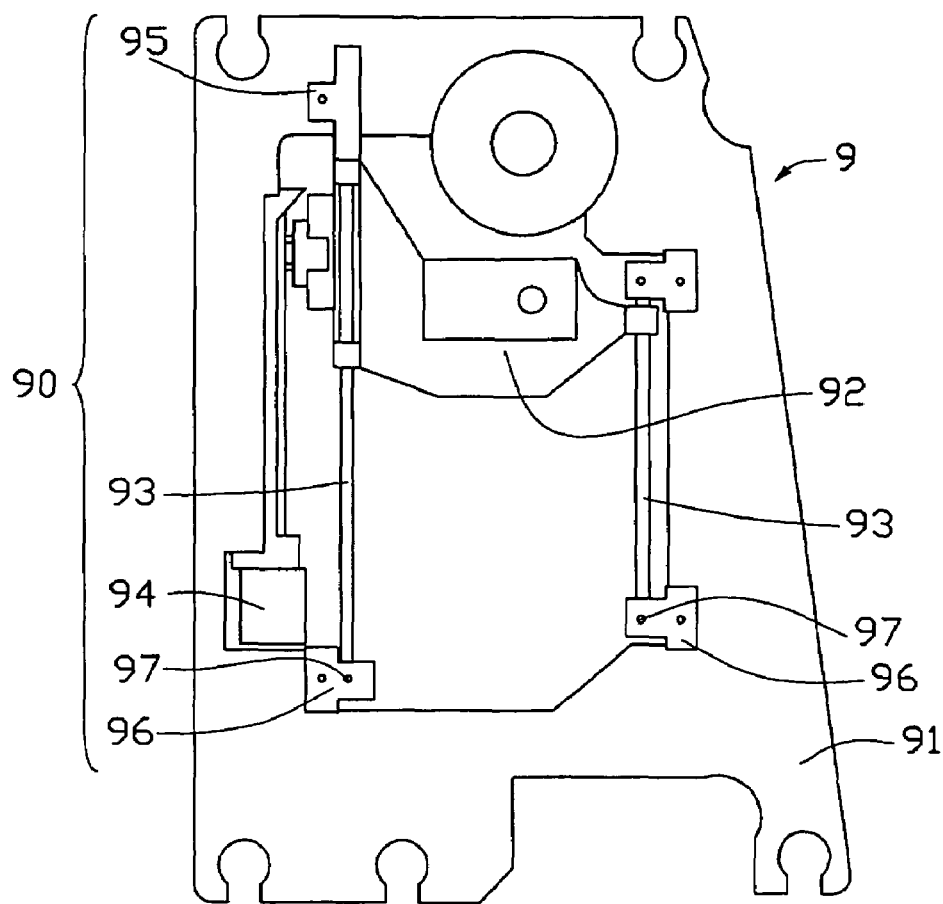
FIG. 5 is a top plan view of an optical disc apparatus, including a conventional feeding mechanism having a plurality of adjustable seats.
Figure 6:
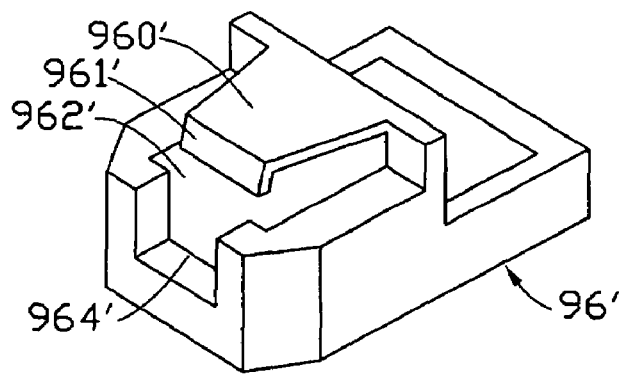
FIG. 6 is an enlarged, isometric view of an adjusting base of another kind of conventional adjustable seat for an optical disc apparatus.

Referring to FIG. 2 and FIG. 4, each adjusting mechanism 46 includes a holding member 60, a spring clip 70, and an adjusting screw 80. The holding member 60 is integrally formed with the chassis 10, for receiving the end of a corresponding guide shaft 42. The spring clip 70 downwardly presses the end of the guide shaft 42 from an upper side thereof, and the adjusting screw 80 props up the end of the guide shaft 42 a desired height. Therefore, the end of the guide shaft 42 can be positioned at a predetermined location.

Each holding member 60 includes a fastening portion 62, a first receiving portion 64, and a second receiving portion 66. The fastening portion 62 is configured for fastening the holding member 60 on the chassis 10. A hole 620 is defined in a bottom of the fastening portion 62. The adjusting screw 80 is inserted through the hole 620 and engaged in a screw hole (not labeled) defined in the chassis 10 below the first receiving portion 64 of the holding member 60. A distal end of the adjusting screw 80 protrudes into the first receiving portion 64.

The first and second receiving portions 64 and 66 extend from a top surface (not labeled) of the fastening portion 62. The first receiving portion 64 includes two opposite first side walls 640, and a front wall 642 interconnected with the opposite first side walls 640, so as to enclose a second receiving chamber 644 for receiving the end of a corresponding guide shaft 42.

The second receiving portion 66 is arranged at an end of the first receiving portion 64 that is distal from the guide shaft 42, and is for fixing a base of the corresponding spring clip 70 to the holding member 60. The second receiving portion 66 defines a vertical recess 660 therein, which spans through a part of the holding member 60 also. The recess 660 is bounded by two opposite sidewalls 661, a distal wall 662, a proximal wall 663, and a top wall 664. The distal wall 662, the proximal wall 663 and the top wall 664 are each perpendicularly interconnected between the opposite sidewalls 661. Two opposite slots 665 are respectively defined in the opposite sidewalls 661, near the proximal wall 663.

The spring clip 70 can be bent from a single metal sheet, and includes two parts: a deformable pressing part 72 and a deformable fixing part 74. The deformable pressing part 72 includes a horizontal connecting portion 720 connecting with the deformable fixing part 74, a slanted portion 722 extending from the horizontal connecting portion 720, and a contact portion 724 formed at a free end of the slanted portion 722. The deformable fixing part 74 includes a first vertical contact portion 740 connecting with the deformable pressing part 72, a slanted portion 742 extending up from a bottom of the first vertical contact portion 740, a second vertical contact portion 744 extending from a top of the slanted portion 742, and a horizontal contact portion 746 extending perpendicularly from the second vertical contact portion 744. Two protrusions 748 extend coplanarly from two lateral sides of the first vertical contact portion 740 respectively.

In assembly, the optical pickup device 30 is slidably engaged on the pair of guide shafts 42. One end of one guide shaft 42 is inserted through the cutout 456 and recess 457 into the first receiving chamber 455 of the corresponding fixing base member 45. Then the other three ends of the guide shafts 42 are respectively inserted into the second receiving chambers 644 of the holding members 60 of the adjusting mechanisms 46. After the ends of the guide shafts 42 have been inserted in the corresponding holding members 60, the deformable fixing part 74 of each spring clip 70 is inserted into the recess 660 of a corresponding holding member 60, with the deformable pressing part 72 downwardly pressing the corresponding end of the corresponding guide shaft 42. The first vertical contact portion 740 and second vertical contact portion 744 of the spring clip 70 respectively resiliently connect with the distal wall 662 and the proximal wall 663 in the recess 660, with the two protrusions 748 being held in the slots 665 of the sidewalls 661. Further, the top wall 664 at the recess 660 abuts the horizontal contact portion 746 of the spring clip 70. Therefore, the deformable fixing part 74 of the spring clip 70 is firmly installed in the recess 660 of the holding member 60.

Then the adjusting screws 80 are inserted through the holes 620 of the fastening portions 62 of the holding members 60 and engaged in the screw holes of the chassis 10, such that ends of the adjusting screws 80 protrude into the second receiving chambers 644. Thus, the ends of the guide shafts 42 in the second receiving chambers 644 are clamped by the adjusting screws 80 from below and the deformable pressing part 72 of the spring clips 70 from above. Therefore, locations of these ends of the guide shafts 42 can be adjusted to a desired height by adjusting the adjusting screws 80 accordingly. In summary, it is a relatively easy operation to place the ends of the guide shaft 42 into the second receiving chambers 644 and then attach the spring clips 70 to the holding members 60. This saves labor and improves the efficiency of assembly.

In the above-described optical disc apparatus 100, one fixing base member 45 and three adjusting mechanisms 46 are used to fastened the pair of guide shafts 42. However, in alternative embodiments, the holding members 60 may themselves provide sufficiently precise locating of the ends of the guide shafts 42. In such case, the adjusting screws 80 are not necessary to adjust locations of the ends of the guide shafts 42, and can be omitted.

It should be emphasized that the above-described embodiments are merely examples of implementations, and have been provided for a clear understanding of the principles of the invention. Many variations and modifications may be made to the above-described embodiments without departing substantially from the spirit and principles of the invention. All such modifications and variations are intended to be included herein within the scope of this disclosure and the present invention and to be protected by the following claims.

What is claimed is:

1. An optical disc apparatus comprising:
   a chassis;
   a pickup device configured to perform writing and/or reading of information with respect to an optical disc;
   a guide shaft configured to movably support said pickup device;
   a fixing base member attached to said chassis and configured to fasten one end of said guide shaft;
   a holding member attached to said chassis, said holding member including a receiving chamber in which a corresponding end of said guide shaft is positioned; and
   an elastically deformable member for resiliently pressing a corresponding end of said guide shaft in said receiving chamber, said deformable member including a pressing portion above said receiving chamber of said holding member and a fixing portion engageable with said holding member for detachably attaching said deformable member to said holding member;
   wherein said holding member further includes a receiving portion aligned with the receiving chamber, said fixing portion of said deformable member is received in said receiving portion.

2. The optical disc apparatus in accordance with claim 1, wherein said receiving portion includes a proximal wall next to said receiving chamber, and a distal wall opposite to said proximal wall, and said fixing portion of said deformable member includes two contact portions elastically contacting with said distal wall and proximal wall of said receiving portion respectively.

3. The optical disc apparatus in accordance with claim 2, wherein said receiving portion further includes two opposite side walls and at least one slot adjacent to said proximal wall, said fixing portion of said deformable member further includes at least one protrusion received in the slot of said holding member.

4. The optical disc apparatus in accordance with claim 2, wherein said receiving portion further includes a top wall partly covering said receiving portion for limiting said fixing portion of said deformable member in said receiving portion of said holding member.

5. The optical disc apparatus in accordance with claim 4, wherein said fixing portion of said deformable member further includes a horizontal contact portion for abutting said top wall of said holding member.

6. The optical disc apparatus in accordance with claim 1, wherein said deformable member is a bent metal sheet.

7. An apparatus for supporting an end of a guide shaft above a chassis, said apparatus comprising:
   a holding member adapted to be attached to said chassis, said holding member including a first receiving portion in which the end of the guide shaft is inserted, and a second receiving portion adjacent to said first receiving portion; and
   an elastically deformable member for resiliently pressing the end of the guide shaft, said deformable member including a pressing portion above said first receiving portion of said holding member and a fixing portion engageably received in said second receiving portion of said holding member for attaching said deformable member to said holding member.

8. The apparatus in accordance with claim 7, wherein said second receiving portion of said holding member includes two opposite walls, and said fixing portion of said deformable member includes two opposite contact parts respectively contacting said two opposite walls of said holding member.

9. The apparatus in accordance with claim 7, wherein said second receiving portion of said holding member includes at least one slot, and said fixing portion of said deformable member includes at least one protrusion inserted in the slot of said holding member.

10. The apparatus in accordance with claim 7, further comprising an adjusting screw inserted through the chassis into said first receiving portion for adjusting a location of the end of the guide shaft.

11. An optical disc apparatus comprising:
    means for supporting optical discs in said optical disc apparatus;
    an optical pickup device movably installable beside said means in said optical disc apparatus for retrieving information from said optical discs; and
    a feeding mechanism for supportively positioning said optical pickup device and guiding movement of said optical pickup device in said optical disc apparatus, said feeding mechanism comprising a chassis disposed beside said means, at least one guide shaft abutting against said optical pickup device so as to allow said optical pickup device guidably movable along said at least one guide shaft while retrieving said information from said optical discs, and at least one holding member attachable to said chassis and capable of accommodating an end of said at least one guide shaft therein, a physically separate, elastically deformable member engageably extending against said at least one holding member for fixedly residing in said at least one holding member and engageably extending against said end of said at least one guide shaft in said at least one holding member so as to contribute to adjustably positioning of said at least one guide shaft relative to said chassis of said feeding mechanism.

12. The optical disc apparatus in accordance with claim 11, further comprising an adjusting screw extending into said at least one holding member engageably against said end of said at least one guide shaft so as to contribute to said adjustably positioning of said at least one guide shaft in cooperation with said elastically deformable member.

13. The optical disc apparatus in accordance with claim 11, wherein said at least one holding member is integrally formed with said chassis.

* * * * *

UNITED STATES PATENT AND TRADEMARK OFFICE
CERTIFICATE OF CORRECTION

PATENT NO. : 7,610,591 B2
APPLICATION NO. : 11/254585
DATED : October 27, 2009
INVENTOR(S) : Wan et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1042 days.

Signed and Sealed this

Twelfth Day of October, 2010

David J. Kappos
*Director of the United States Patent and Trademark Office*